April 22, 1952     W. P. STOKES     2,593,625
NUT GATHERING MACHINE
Filed July 10, 1945     2 SHEETS—SHEET 1
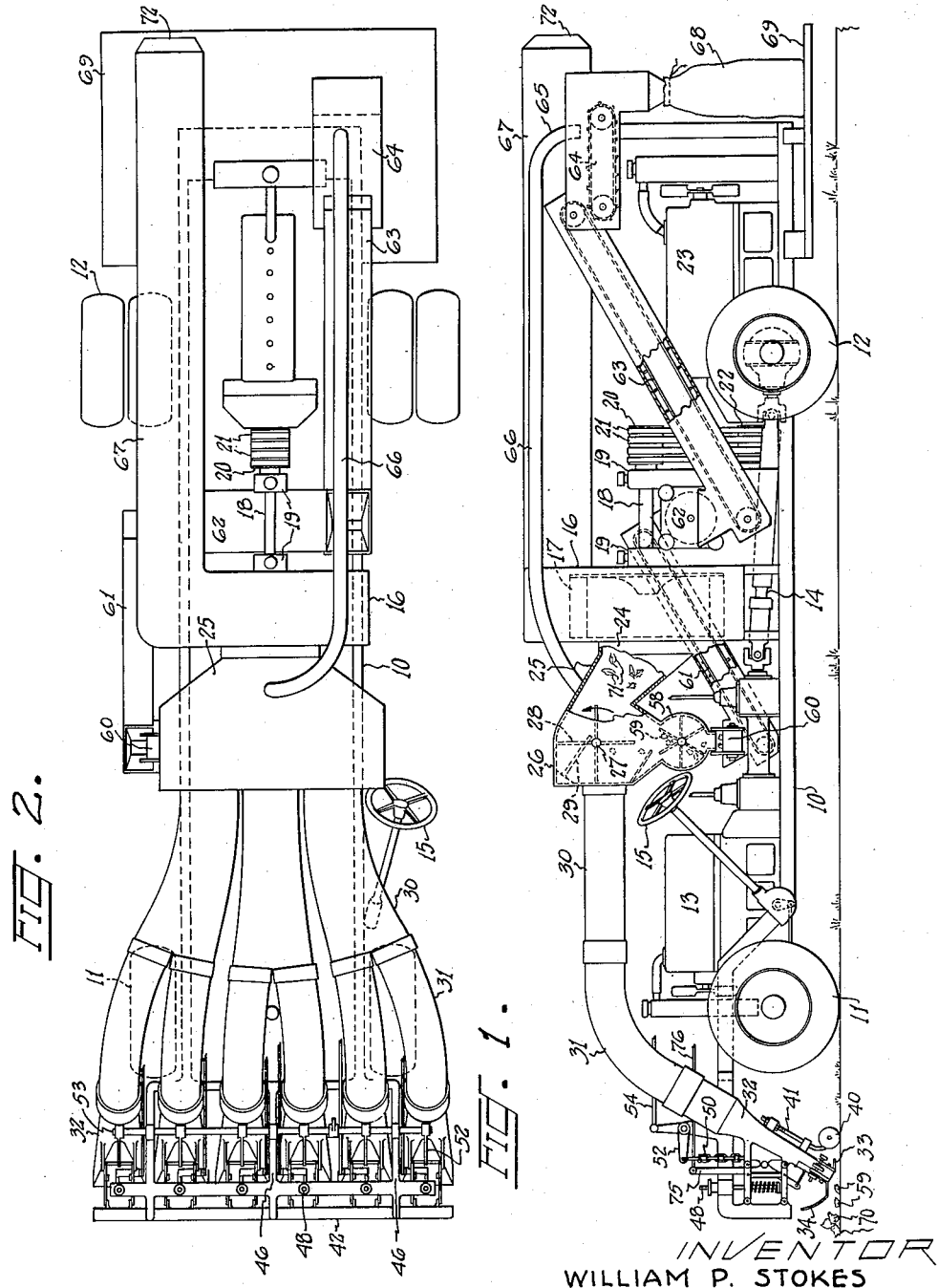
INVENTOR
WILLIAM P. STOKES
BY
ATTORNEY April 22, 1952 W. P. STOKES 2,593,625
NUT GATHERING MACHINE
Filed July 10, 1945 2 SHEETS—SHEET 2
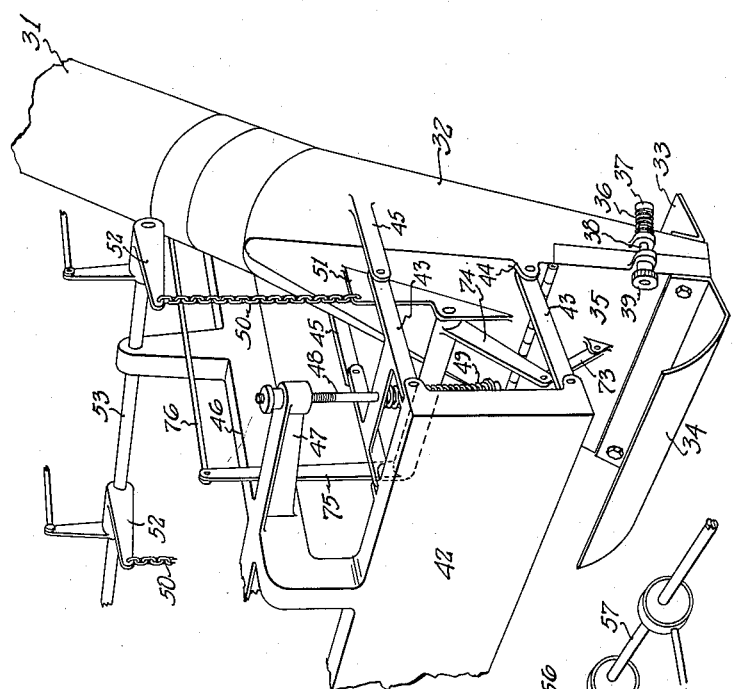
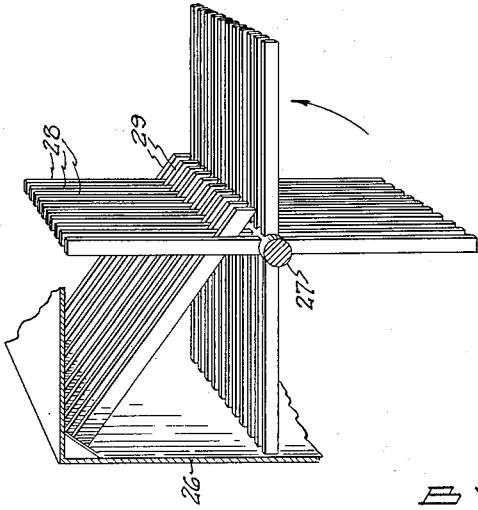
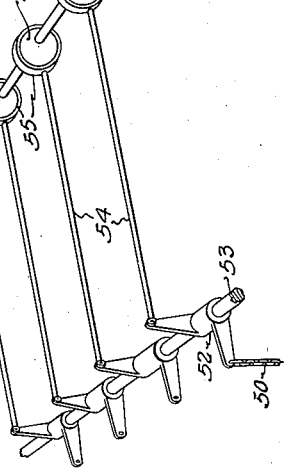
INVENTOR
WILLIAM P. STOKES
ATTORNEY Patented Apr. 22, 1952

2,593,625

UNITED STATES PATENT OFFICE 2,593,625

NUT GATHERING MACHINE

William P. Stokes, Portland, Oreg., assignor of one-fourth to Harry J. Casey, one-fourth to Gordon Goodpasture and one-fourth to Leo R. Pearson Application July 10, 1945, Serial No. 604,263

2 Claims. (Cl. 56—328)

This invention relates generally to harvesting machines and particularly to an apparatus for picking nuts from the ground.

The main object, is the provision of a special form of pick-up mechanism with means for actuating same in order that the pick-up nozzles will not become clogged due to piles of dirt or drifts of leaves which they may encounter in travelling over the ground.

I accomplish these and other objects in the manner set forth in the following specification as illustrated in the accompanying drawings, in which:

Fig. 1 is a side elevation of the machine with portions broken away in section.

Fig. 2 is a plan of Fig. 1.

Fig. 3 is a fragmentary perspective view on a larger scale of the pick-up shoe and associated parts.

Fig. 4 is a perspective view of the beater or separating unit with parts broken away and also on a larger scale.

Fig. 5 is a perspective view showing the mechanism by which the various shoes are operated in succession.

Similar numerals refer to similar parts throughout the several views.

Referring in detail to the drawing, there is shown a chassis 10 which is supported by the ground engaging wheels 11 and 12 and driven from a power plant 13 through the propeller shaft 14. The wheels 11 are steered by means of the conventional steering wheel 15. Mounted on the chassis 10 between the wheels 11 and 12 is a fan casing 16 within which is disposed a fan 17 whose shaft 18 journals in the bearings 19 and on which shaft 18 is secured the multiple V-belt pulley 20 whose belts 21 are driven by the pulley 22 from the fan motor 23.

The inlet 24 of the fan 17 is connected by a duct 25 with the separating chamber 26 within which is mounted the horizontal shaft 27 from which radiate the beater arms 28. The stationary beater arms 29 extend between the arms 28 and the shaft 27 rotates in the direction indicated.

Connected with the separating chamber 26 is a suction pipe 30 whose flexible end 31 is provided with a nozzle 32 having the rearwardly turned shoes 33 on the rearward edge thereof and having the upwardly turned shoe 34 secured at the lower edge of the hinged side 35 of the nozzle 32. The hinged side 35 is urged toward a closed position by means of a spring 36 which is disposed under the head 37 of the bolt 38 whose knurled nut 39 controls the compression of the spring 36.

A roller 40 mounted on the spindle 41 which is attached to the nozzle 32 holds the shoe 33 just clear of the ground. It will be understood that it is the normal practice to roll the ground as smooth as possible before the nuts begin to fall.

It will be noted in Fig. 3 that there is provided a cross member 42 which is provided with the H-bar connecting links 43, which in turn are hingedly connected to the ears 44 and 45 formed on the sides of the nozzle 32. The bar 42 is supported by the beam 46 which projects from the frame 10.

Extending laterally from the beam 46 are the brackets 47 which carry the spring rods 48 on whose lower ends are mounted the springs 49 which act as buffers or shock absorbers.

It will be understood that the member 42 is fixed with relation to the chassis 10 while the nozzle 32 can float in a somewhat vertical direction. This movement is brought about by a chain 50 which is attached to the clip 51 on the nozzle 32. The upper end of the chain 50 is attached to a bell crank lever 52 which is free to turn on the supporting shaft 53. Although the bell cranks 52 could be secured on the shaft 53 and operated in unison, it is desirable to have each of the bell cranks 52 operated by a separate pull rod 54 which extend to the straps 55 of the eccentrics 56 which are mounted on the shaft 57. The timing of the eccentrics 56 is preferably such as to make the shoe lifting operation successive instead of simultaneous.

Below the separating chamber 26 is disposed a valve 58 in the form of a vaned wheel into which the nuts 59 can fall, and be permitted to drop onto the transverse carrier 60 from whence they are carried by the elevating conveyor 61 and discharged into the transverse scrubbing element 62 from whence they are again carried upwardly by means of the elevator 63 and discharged into the horizontal conveyor 64 by which time all of the dirt and trash has either been removed or separated from the nuts so that any leaves which remain as the nuts pass over the conveyor 64 are picked up by the suction nozzle 65 and returned by the duct 66 to the duct 25 from whence they are carried by the fan discharge pipe 67 and put back on the land while the nuts themselves pass from the conveyor 64 into the sacks 68 which rest upon the platform 69 suspended from the chassis 10.

The machine thus far described is complete and capable of handling a wide variety of objects under different conditions. For example, in some cases the more violent scrubbing actions would not be desired or required. In other cases leaf return elements could be omitted or otherwise cared for without departing from the spirit of this invention.

It is highly important that in operating a machine of this type the soil be prepared by rolling as smoothly as possible before the nuts begin to fall and in addition thereto the various nozzles 32 be independently flexible to permit the self adjustability to the contour of the ground.

In the normal operation of this machine the supporting wheels or rollers 40 are set to hold the shoe 33 just above the surface of the ground. As the vehicle advances on the wheels 11 and 12 and the fan 17 is operated by the motor 23 and air is drawn into the nozzle 32 all of the loose particles such as nuts 59 or the unhusked nuts 70 or leaves 71 are drawn up through the pipe 30 and discharged into the separating beater element to which rotation is imparted in the direction indicated by means (not shown) so that the nuts will fall downwardly into the valve while the leaves will be carried over into the fan discharge duct tip 72.

In some cases it will be found desirable to actually raise and lower the nozzle 32 for the purpose of preventing accumulations of leaves at the nozzle. In other cases it will be found desirable to subject the hinged member 35 to an opening and closing movement by means of a link 73 which attaches the member 35 to a bell crank lever 74 whose end 75 is connected by a pull rod 76 to the eccentrics 56.

Numerous attempts have been made to build a machine of this character but the principal difficulty resides in the wide range of operating conditions as to climate, moisture, ground conditions, and the particular type of article being harvested, but with the present machine extreme flexibility is obtained and the operator merely renders operative those elements which are required for a given type of harvesting.

I claim:

1. A nut harvester for gathering nuts from the ground comprising a wheeled support, a plurality of suction nozzles carried thereby mounted in transverse alignment, each of said nozzles having an eccentric actuator for raising the nozzles from the ground, and a drive shaft on which all of said eccentrics are mounted and on which they are rotatably spaced for alternately raising the various nozzles.

2. A nut harvester for gathering nuts from the ground comprising a wheeled frame, a plurality of suction nozzles carried thereby in transverse alignment, each of said nozzles having a supporting roller for fixing its lowermost position, an eccentric lift for each nozzle, a drive shaft for said eccentric lifts timed to operate said lifts in succession, and shoes along the leading edges of said nozzles for riding over the leaves in the paths of said nozzles.

WILLIAM P. STOKES.

REFERENCES CITED

The following references are of record in the file of this patent:

UNITED STATES PATENTS

| Number | Name | Date |
|---|---|---|
| 953,771 | Wilder | Apr. 5, 1910 |
| 1,168,175 | Deardorff | Jan. 11, 1916 |
| 1,212,644 | Johnson | Jan. 16, 1917 |
| 1,330,488 | Nelson | Feb. 10, 1920 |
| 1,558,924 | Riggs | Oct. 27, 1925 |
| 1,823,387 | Campbell | Sept. 15, 1931 |

FOREIGN PATENTS

| Number | Country | Date |
|---|---|---|
| 22,035 | Norway | Feb. 19, 1912 |